US007547477B2

(12) United States Patent
Matsuno

(10) Patent No.: US 7,547,477 B2
(45) Date of Patent: Jun. 16, 2009

(54) COATED METAL FORMED ARTICLE AND METHOD FOR PRODUCING COATED METAL FORMED MATERIAL

(75) Inventor: Takemi Matsuno, Yokohama (JP)

(73) Assignee: Nakata Coating Co., Ltd., Yokohama-Shi, Kanagawa (JP)

( * ) Notice: Subject to any disclaimer, the term of this patent is extended or adjusted under 35 U.S.C. 154(b) by 407 days.

(21) Appl. No.: 10/583,945

(22) PCT Filed: Feb. 25, 2005

(86) PCT No.: PCT/JP2005/003102

§ 371 (c)(1),
(2), (4) Date: Jun. 22, 2006

(87) PCT Pub. No.: WO2005/084942

PCT Pub. Date: Sep. 15, 2005

(65) Prior Publication Data

US 2007/0184254 A1 Aug. 9, 2007

(30) Foreign Application Priority Data

Mar. 9, 2004 (JP) ............................ 2004-065015

(51) Int. Cl.
*B32B 15/08* (2006.01)
*B05D 1/02* (2006.01)

(52) U.S. Cl. ....................... 428/626; 428/659; 428/421; 428/429; 428/457; 427/427; 427/406; 427/409

(58) Field of Classification Search ................. 428/626, 428/658, 659, 613, 212, 213, 215, 220, 335, 428/336, 334, 457; 427/446, 455, 421.1, 427/427, 407.1, 409
See application file for complete search history.

(56) References Cited

U.S. PATENT DOCUMENTS 5,853,890 A * 12/1998 Odawa et al. ............... 428/412
2005/0031894 A1* 2/2005 Klos et al. .................. 428/659

FOREIGN PATENT DOCUMENTS

JP 2002-292792 A 10/2002
JP 2003-071980 * 3/2003
JP 2003-71980 A 3/2003
JP 2003-328151 * 11/2003
JP 2003-328151 A 11/2003

* cited by examiner

*Primary Examiner*—John J Zimmerman
(74) *Attorney, Agent, or Firm*—Manabu Kanesaka

(57) ABSTRACT

A coated metal formed article includes: a metal formed article, a zinc-containing porous coating layer laminated on a surface of the metal formed article, a phenol-modified silicon compound layer laminated on the zinc-containing porous coating layer, and a fluorine resin-containing layer laminated on the phenol-modified silicon compound layer. The fluorine resin containing layer contains a fluorine resin and at least one organic resin selected from a polyester resin, a polyacryl resin, a polyolefin resin, a polyurethane resin, and a polycarbonate resin. An amount of the fluorine resin ranges from 1 to 200 parts by weight with respect to 100 parts by weight of the organic resin. When a thickness of the phenol-modified silicon compound layer is t2 (μm) and a thickness of the fluorine resin-containing layer is t1 (μm), a ratio of t1 to t2 ranges from 0.05 to 50 so that dimensional accuracy and mechanical properties are increased.

13 Claims, 5 Drawing Sheets

COATED METAL FORMED ARTICLE AND METHOD FOR PRODUCING COATED METAL FORMED MATERIAL

TECHNICAL FIELD

The present invention relates to a coated metal formed article and a method for producing the same, and in particular to a coated metal formed article which can obtain the excellent anti-rust properties and so on without subjecting it to a chromate treatment and a method for producing such a coated metal formed article.

BACKGROUND OF THE INVENTION

An anti-rust technology has been widely used in the art, where a blast material consisting of a core substantially made of iron and a multi-layered particle aggregate substantially made of zinc and formed around the core is projected on the surface of a coated metal formed article to form a porous covering layer (hereinafter, which may be also referred to as a zinc-containing porous layer). Then, the zinc-containing porous coating layer is subjected to a chromate treatment to allow a coating layer made of a chrome compound such as chromic acid, dichromic acid, chromate, or the like to be impregnated into such a coating layer (see, Patent Document 1).

The anti-rust technology is carried out industrially on a large scale because a coated metal formed article can be allowed to show a high adhesion on the surfaces of a zinc-containing porous coating layer and a coated metal formed article and facilitated to have a uniform thickness of the coating layer, as well as being comparatively cheep in comparison.

Furthermore, a metal-surface treating agent that contains a nitrogen compound in a concentration of 0.1 g/l to 20 g/l and a zirconium compound in a concentration of 0.1 g/l to 50 g/l with respect to an aqueous resin solution in a concentration of 0.5 g/l to 200 g/l is disclosed (see, Patent Document 2).

Furthermore, a coated metal formed article, in which a porous coating layer made of zinc or a zinc-iron alloy, an intermediate layer made of a silicon compound/thermosetting resin, and a silicon compound layer provided as a surface synthetic resin layer are sequentially formed on the surface of a metal formed article, is disclosed (see, Patent Document 3).

Furthermore, there is disclosed a method for producing a corrosion-resistant iron material prepared by forming a porous coating layer made of zinc or aluminum on the surface of an iron formed article with a thermal-spraying device, and then forming a coating layer containing, for example, methyl silicate, ammonia silicate, pyrocatechine, trihydroxybenzoic acid ethyl ester, methyl trimethoxysilane, and tetrabutoxy zirconate by a heat treatment (see, Patent Document 4).

[Patent Document 1] JP 59-9312 B (Claims)
[Patent Document 2] JP 2000-204485 A (Claims)
[Patent Document 3] JP 2002-292792 A (Claims)
[Patent Document 4] JP 2003-328151 A (Claims)

DISCLOSURE OF THE INVENTION

Means to Solve the Invention

However, in the anti-rust technology disclosed in Patent Document 1, a problem has been found in that a chromate solution should be used when a chromate treatment is carried out on a zinc-porous coating layer. That is, the chromate liquid used for the chromate treatment-contains a chrome compound, such as chromic acid, dichromic acid, or chromate, designated as a poisonous substance, so that it can be under various legal regulations. Therefore, as an alternative technology, an ant-rust technology having high safety with less environmental issues has been demanded.

Furthermore, the metal-surface treating agent as disclosed in Patent Document 2 has not only the insufficient anti-rust properties and the corrosion resistance, but also a difficulty in strong formation of a coating film containing a fluorine resin on a coating film made of a metal-surface treating agent even though a silicon coating film or the like may be formed on a coating film made of a metal-surface treating agent.

In addition, a coated metal formed article as disclosed in Patent Document 3 has a three-layered structure, so that the predetermined anti-rust properties and the corrosion resistance can be obtained. In contrast, however, the results for the corrosion resistance in a salt spray test are still insufficient, and a problem has been found in that the type of a surface synthetic resin layer could be restricted by a silicon compound or the like.

Furthermore, according to a method for producing an anti-corrosion iron material as disclosed in Patent Document 4, an iron material having comparatively the good anti-rust properties and the corrosion resistance could be obtained. However, as the iron material has a two-layered structure without a surface-protective layer, a problem has been found in that a significant decrease in the corrosion resistance in a salt spray test depending on the kind of a phenol compound added to a silicon compound or the like or the amount thereof added.

Therefore, as a result of intensive studies for solving the above problems, the present invention has been accomplished by finding out that a coated metal formed article having the excellent anti-rust properties and the corrosion resistance without depending on the kind of a phenol compound to be added to a silicon compound or the like and the amount of such a compound added as well as without carrying out a chromate treatment, by sequentially forming a zinc-containing porous coating layer, a phenol-modified silicon compound layer, and a fluorine resin-containing layer to make at least a three-layered structure while forming a fluorine resin-containing layer comprised of a predetermined organic resin and a fluorine resin.

In other words, an object of the present invention is to provide: a coated metal formed article having the excellent anti-rust properties and the corrosion resistance due to a synergetic effect among a zinc-containing porous coating layer, a phenol-modified silicon compound, and a fluorine resin-containing layer, as well as having an excellent environmental advantage; and a method for producing a coated metal formed article, by which such a coated metal formed article could be efficiently produced.

Means to Solve the Problem

According to the present invention, the above problems can be solved by providing a coated metal formed article comprised of a zinc-containing porous coating layer, a phenol-modified silicon compound layer, and a fluorine resin-containing layer, which are sequentially formed on the surface of a metal formed article, where the fluorine resin-containing layer contains at least one organic resin selected from a polyester resin, a polyacryl resin, a polyolefin resin, a polyurethane resin, and a polycarbonate resin, as well as a fluorine resin in an addition amount of 1 to 200 parts by weight with respect to 100 parts by weight of the organic resin.

Furthermore, according the coated metal formed article of the present invention, it is preferable that a zinc-containing porous coating layer, a phenol-modified silicon compound layer, and a fluorine resin-containing layer may be sequentially formed on the surface of a metal formed article and the ratio of t1 to t2 (t1/t2) may be in the range of0.05 to 50 when the thickness of the phenol-modified silicon compound layer is defined as t2 (μm) and the thickness of the fluorine resin-containing layer is defined as t1 (μm).

Furthermore, for constructing the coated metal formed article of the present invention, the ratio of t2 to t3 (t2/t3) may be preferably in the range of 0.06 to 10 when thickness of the zinc-containing porous coating layer is defined as t3 (μm).

Furthermore, for constructing the coated metal formed article of the present invention, it is preferable that the thickness (t1) of the fluorine resin-containing layer may be in the range of 0.5 to 1,000 μm, the thickness (t2) of the phenol-modified silicon compound layer may be in the range of 1 to 200 μm, and the thickness (t3) of the zinc-containing porous coating layer is in the range of 3 to 50 μm.

Furthermore, for constructing the coated metal formed article of the present invention, it is preferable that the phenol-modified silicon compound layer by be constructed of a mixture or reactant of a silicon compound and a phenolic compound, and also the amount of the phenolic amount added may be in the range of 10 to 50 parts by weight with respect to 100 parts by weight of the silicon compound.

Furthermore, for constructing the coated metal formed article of the present invention, it is preferable that the fluorine resin-containing layer may contain a lubricant agent, and also the amount of the lubricant agent added may be in the range of 1 to 30 parts by weight with respect to 100 parts by weight of the fluorine resin.

Furthermore, for constructing the coated material formed article of the present invention, it is preferable that the fluorine resin-containing layer may contain a coloring agent, and also the amount of the coloring agent added may be in the range of 1 to 30 parts by weight with respect to 100 parts by weight of the fluorine resin.

Furthermore, another aspect of the present invention is a method for producing a coated metal formed article, featured by comprising the following sequential steps (1) to (4):

(1) preparing step for a metal formed article;

(2) forming step for a zinc-containing porous layer using a thermal-spraying device;

(3) forming step for a phenol-modified silicon compound layer;

(4) forming step for a fluorine resin-containing layer containing at least one organic resin selected from a polyester resin, a polyacryl resin, a polyolefin resin, a polyurethane resin, and a polycarbonate resin, as well as a fluorine resin in an addition amount of 1 to 200 parts by weight with respect to 100 parts by weight of the organic resin.

Effects of the Invention

According to the coated metal formed article of the present invention, a coated metal formed article having the excellent anti-rust properties and the corrosion resistance could be provided without subjecting it to a chromate treatment and without depending on the kind or amount of a phenol compound to be added to a silicon compound or the like by sequentially forming a zinc-containing porous coating layer, a phenol-modified silicon compound layer, and a fluorine resin-containing layer on the surface of a metal formed article to make at least a three-layered structure in addition to make the fluorine resin-containing layer from predetermined amounts of an organic resin and a fluorine resin.

In addition, the phenol-modified silicon compound layer contains the phenol compound and also contains a predetermined amount of the organic resin in the fluorine resin-containing layer, so that an excellent adhesion could be attained between the phenol-modified silicon compound layer and the fluorine resin-containing layer.

Furthermore, the coated metal formed article can be provided with various surface characteristics as well as easiness to coloring and lubrication by allowing the fluorine resin-containing layer to include a predetermined amount of the organic resin.

Furthermore, according to the coated metal formed article of the present invention, by defining the ratio of the thickness (t1) of the fluorine resin-containing layer to the thickness (t2) of the phenol-modified silicon compound layer within a predetermined range, a coated metal formed article having the excellent anti-rust properties and the corrosion resistance which are equal to or higher than those attained by one subjected to a chromate treatment, without subjecting it to a chromate treatment and also without depending on the kind or amount of a phenol compound to be added to the silicon compound.

Furthermore, according to the coated metal formed article of the present invention, because of its simple structure, a coated metal formed article having dimensional accuracy and mechanical properties, which may be applied to any of members and parts of various kinds of machinery or the like, could be obtained.

Furthermore, according to the coated metal formed article of the present invention, by defining the ratio of the thickness (t2) of the phenol-modified silicon compound layer to the thickness (t3) of zinc-containing porous coating layer within a predetermined range, a coated metal formed article having the excellent anti-rust properties and the corrosion resistance which are equal to or higher than those attained by one subjected to a chromate treatment could be stably obtained. As constructed above, a coated metal formed article which is excellent in dimensional accuracy and mechanical properties could be also stably obtained.

Furthermore, according to the coated metal formed article of the present invention, by defining the ratios among the thickness (t1) of the fluorine resin-containing layer, the thickness (t2) of the phenol-modified silicon compound layer, and the thickness (t3) of the zinc-containing porous coating layer within a predetermined range, a coated metal formed article having the excellent anti-rust properties and the corrosion resistance which are equal to or higher than those attained by one subjected to a chromate treatment could be stably obtained.

Furthermore, according to the coated metal formed article of the present invention, by defining the ratio of the addition amount of the silicon compound to the addition amount of phenolic compound in the phenol-modified silicon compound layer within a predetermined range, a coated metal formed article having the excellent anti-rust properties and the corrosion resistance which are equal to or higher than those attained by one subjected to a chromate treatment could be stably obtained.

Furthermore, according to the coated metal formed article of the present invention, by allowing the fluorine resin-containing layer to include a lubricant agent and defining the addition amount of the lubricant agent within a predetermined range, thereby obtaining a coated metal formed article having a more excellent adhesion of the fluorine resin-containing layer to the phenol-modified silicon compound layer while improving the dispersibility of the fluorine resin in the fluorine resin-containing layer.

Furthermore, according to the coated metal formed article of the present invention, a coated metal formed article provided in color could be obtained by allowing the fluorine resin-containing layer to include a coloring agent and defining the addition amount of the coloring agent within a range, so that it could be applied to various purposes.

Furthermore, according to the method for producing a coated metal formed article, by sequentially forming a zinc-containing porous coating layer., a phenol-modified silicon compound layer, and a predetermined fluorine resin-containing layer, a coating metal formed article having the excellent anti-rust properties and the corrosion resistance which are equal to or higher than those attained by one subjected to a chromate treatment could be stably obtained without subjecting to a chromate treatment and also without depending on the kind or addition amount of a phenol compound.

BEST MODE FOR CARRYING OUT THE INVENTION

Hereinafter, the embodiments of the method for producing a coated metal formed article of the present invention and the embodiments of such a production method of the coated metal formed article will be concretely described with reference to the adhered drawings properly.

FIRST EMBODIMENT

Figure 1:
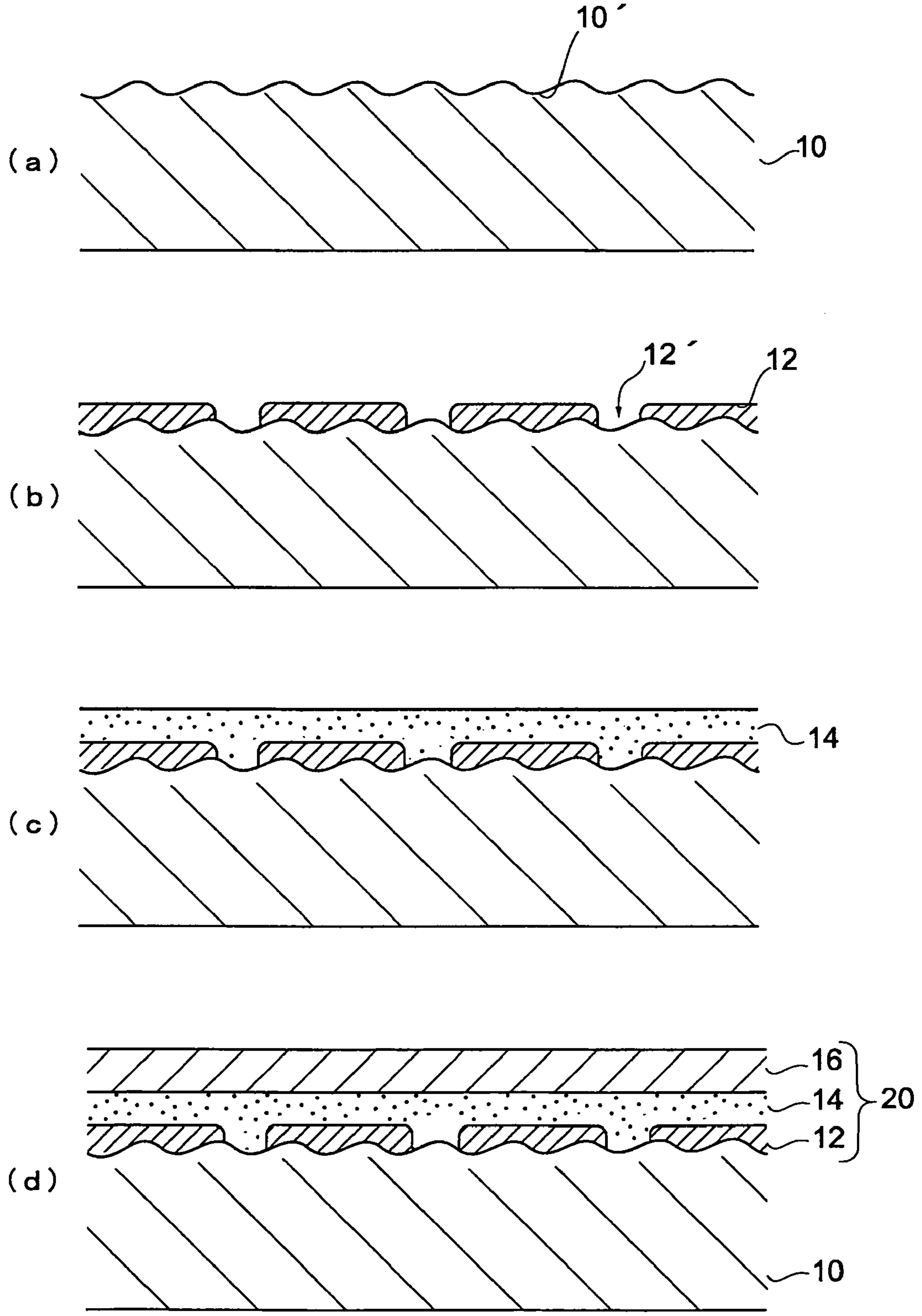
FIG. 1 is a schematic diagram, where ( *a*) to (*d*) are provided for illustrating the steps for carrying out a surface treatment on a metal formed article, forming a zinc-containing porous coating layer, forming a phenol-modified silicon compound, and forming a fluorine resin-containing layer, respectively.

As illustrated in FIG. 1(*d*), a first embodiment of the invention is a coated metal formed article 20 which is prepared by sequentially forming a zinc-containing porous coating layer 12, a phenol-modified silicon compound layer 14 and a fluorine resin-containing layer 16 on the surface of a metal formed article 10, allowing the fluorine resin-containing layer 16 to contain a fluorine resin as well as at least one organic resin selected from a polyester resin, a polyacryl resin, a polyolefin resin, a polyurethane resin, and a polycarbonate resin, where the amount of the fluorine resin added is in the range of 1 to 200 parts by weight with respect to 100 parts by weight of the organic resin.

In other words, on the surface of the metal formed article 10, both the phenol-modified silicon compound layer 14 and the specific fluorine resin-containing layer 16 are sequentially formed as well as the zinc-containing porous layer 12, so that such a composite lamination of layers 14, 16 may synergistically show a blocking effect on oxygen, moisture, salt, and so on to effectively prevent the oxidative deterioration of both the zinc-containing porous layer 12 and the metal formed article 10 as a substrate layer.

More specifically, a part of the phenol-modified silicon compound layer 14 can be introduced into the inside of the zinc-containing porous layer 12 to form a complex, so that they could be firmly adhered, thereby allowing the phenol-modified silicon compound layer 14 to effectively block moisture, salt, and so on. In addition, the fluorine resin-containing layer 16 having low water-repellency and oxygen-permeability as well as resistance to heat and chemicals is further mounted on the phenol-modified silicon compound layer 14, so that oxygen as well as moisture and salt can be also blocked, thereby synergistically preventing oxidative deterioration of both the zinc-containing porous layer 12 and the metal formed article 10.

Furthermore, even though making a strong adhesion between the silicon compound layer the fluorine resistance-containing layer is difficult, however, the first embodiment enables a strong adhesion between the phenol-modified silicon compound layer 14 and the fluorine resin-containing layer 16 as the phenol-modified silicon compound layer 14 is prepared by subjecting a silicon compound to a phenol-denaturation treatment and the fluorine resin-containing layer 16 contains a predetermined amount of organic resin. Therefore, the phenol-modified silicon compound layer 14 and the fluorine resin-containing layer 16 could be strongly adhered, thereby effectively blocking the invasion of oxygen, moisture, salt and so on through the interface.

Consequently, in the case of the first embodiment, there is no need of a chromate treatment on the coated metal formed article 20 and the coated metal formed article 20 does not require a chromate treatment and could show the excellent anti-rust properties and the corrosion resistance, which are equal to or more than those of one subjected to the chromate treatment, without depending on the kind or amount of a phenol compound to be added to the silicon compound.

1. Metal Formed Article

The materials for the metal formed article 10 exemplified in FIG. 1(*a*) and so on include, but not limited to, carbon steel, steel alloy, stainless steel, and special steel.

In addition, any metal formed articles made of such a material may be processed into a desired shape such as a tabular or rod shape by any of various methods including rolling, casting, drawing, and casting, or alternatively may be a member or part of any of various mechanical devices. Therefore, it is intended for members and parts of mechanical devices for transport vehicles, building materials, chemicals, pharmaceuticals, foods, processed marine products, semiconductors, and so on. More specifically, they include fastening means such as braces, nails, volts, nuts, screws, washers, clamps, pins, dowels, and coils; various parts for vehicles (typically auto parts); and building parts (such as building ironware).

2. Zinc-containing Porous Coating Layer

Furthermore, the zinc-containing porous coating layer 12 as exemplified in FIG. 1(*b*) and so on may preferably a coating layer constructed of an aggregate of pressure-bonded chips made of zinc-iron alloy and having a porous structure.

In other words, the representative zinc-containing porous coating layer could be formed by projecting a blast material, zinc-coated particles each having a core made of high-gravity iron or the like and an intermediate made of high-hardness iron-zinc alloy, on the surface of a metal formed article with considerable projection energy using, for example, a thermal-spraying device.

Here, the thickness (t3) of the zinc-containing porous coating layer is preferably in the range of 3 to 50 μm because of the follows: When the zinc-containing porous coating layer has a thickness of below 3 μm, the film formability thereof may remarkably decrease or the anti-rust properties or the corrosion resistance of the metal formed article may remarkably decrease.

In contrast, when the zinc-containing porous coating layer has a thickness of more than 50 μm, a film in uniform thickness may be hardly formed or an adhesion with the metal formed article may remarkably decrease.

Therefore, it is preferable to make the zinc-containing porous coating layer in a thickness of preferably 5 to 40 μm, more preferably 8 to 30 μm.

3. Phenol-modified Silicon Layer (1) Basic Configuration

The phenol-modified silicon compound layer 14 as illustrated in FIG. 1(*c*) and so on is a two-dimensional or three-dimensional structure in which the silicon compound and the phenol compound are in combination with each other. Preferably, a part of the phenol compound may be impregnated into the zinc-containing porous coating layer at the interface therewith to form a complex.

Typically, the phenol-modified silicon compound layer can be prepared by mixing low molecular materials (monomers or oligomers)of silicon and phenol compounds as starting materials with each other or subjecting them to a polymerization reaction.

Alternatively, in a state that the silicon-compound polymer is coexisting with the phenol-compound polymer, it also preferable to prepare the phenol-modified silicon compound layer by mixing low molecular materials (monomers or oligomers) of silicon and phenol compounds as starting materials with each other or subjecting them to a polymerization reaction. This is because such a configuration can impart more excellent film formability to that layer.

Furthermore, monomers and oligomers used for forming the phenol-modified silicon compound layer include silicon monomers and oligomers, such as tetraalkoxy silane, alkyltrialkoxy silane, dialkyldialkoxy silane, methylsilicate, ethylsilicate, lithium silicate, sodium silicate, potassium silicate, methyltripropanol ammonium silicate, and dimethydipropanol ammonium silicate.

More specifically, alkyl groups in tetraalkoxy silane and so on include a methyl group, an ethyl group, a propyl group, a butyl group, a vinyl group, and a phenyl group. In addition, alkoxy groups in tetraalkoxy silane and so on include a methoxy group, an ethoxy group, and a propoxy group.

Furthermore, phenol compounds used for forming the phenol-modified silicon compound layer include monovalent phenols such as phenol, cresol, thymol, bromophenol, naphthol, and aniliophenol; bivalent phenols such as pyrocatechine (catechol), resorcin, hydroquinone, orcin, urushiol, bisphenol A, and binaphthol; and trivalent phenols such as pyrogallol, phloroglucin, hydroxyhydroquinone, and trihydroxybenzoic acid.

Furthermore, as a principle component of the phenol compound, for example, a phenol resin having a molecular weight of about 500 to 5,000 may be preferably used.

For the addition ratio of the phenol compound to the silicon compound in the phenol modified silicon compound layer, the amount of the phenol compound added may be preferably in the range of 1 to 50 parts by weight with respect to 100 parts by weight of the silicon compound because of the follows:

When the amount of the phenol compound is below 1 part by weight, the film formability may remarkably decrease or the anti-rust properties or the corrosion resistance of the metal formed article may remarkably decrease.

In contrast, when the amount of the phenol compound added exceeds 50 parts by weight, a film in uniform thickness may be hardly formed or a compatibility with the silicon compound may remarkably decrease.

Therefore, the amount of the phenol compound added is preferably in the range of 5 to 40 parts by weight, more preferably in the range of 15 to 30 parts by weight with reference to 100 parts by weight of the silicon compound.

Furthermore, the thickness (t2) of the phenol-modified silicon compound layer may be preferably defined in consideration of the thickness (t1) of the fluorine resin-containing layer. In other words, it is characterized in that the ratio of t1 to t2 (t1/t2) is within the range of 0.05 to 50 because of the follows:

When the ratio of t1 to t2 (t1/t2) is below 0.05, the film formability of the phenol-modified silicon compound layer may remarkably decrease or the anti-rust properties or the corrosion resistance of the metal formed article may remarkably decrease.

On the other hand, when the ratio of t1 to t2 (t1/t2) exceeds 50, a film in uniform thickness may be hardly formed, so that the adhesion thereof could be decreased and as a result the anti-rust properties or the corrosion resistance of the metal formed article may remarkably decrease.

Therefore, the ratio of t1 to t2 (t1/t2) is preferably defined in the range of 0.2 to 20, more preferably in the range of 0.7 to 5.

Figure 2:
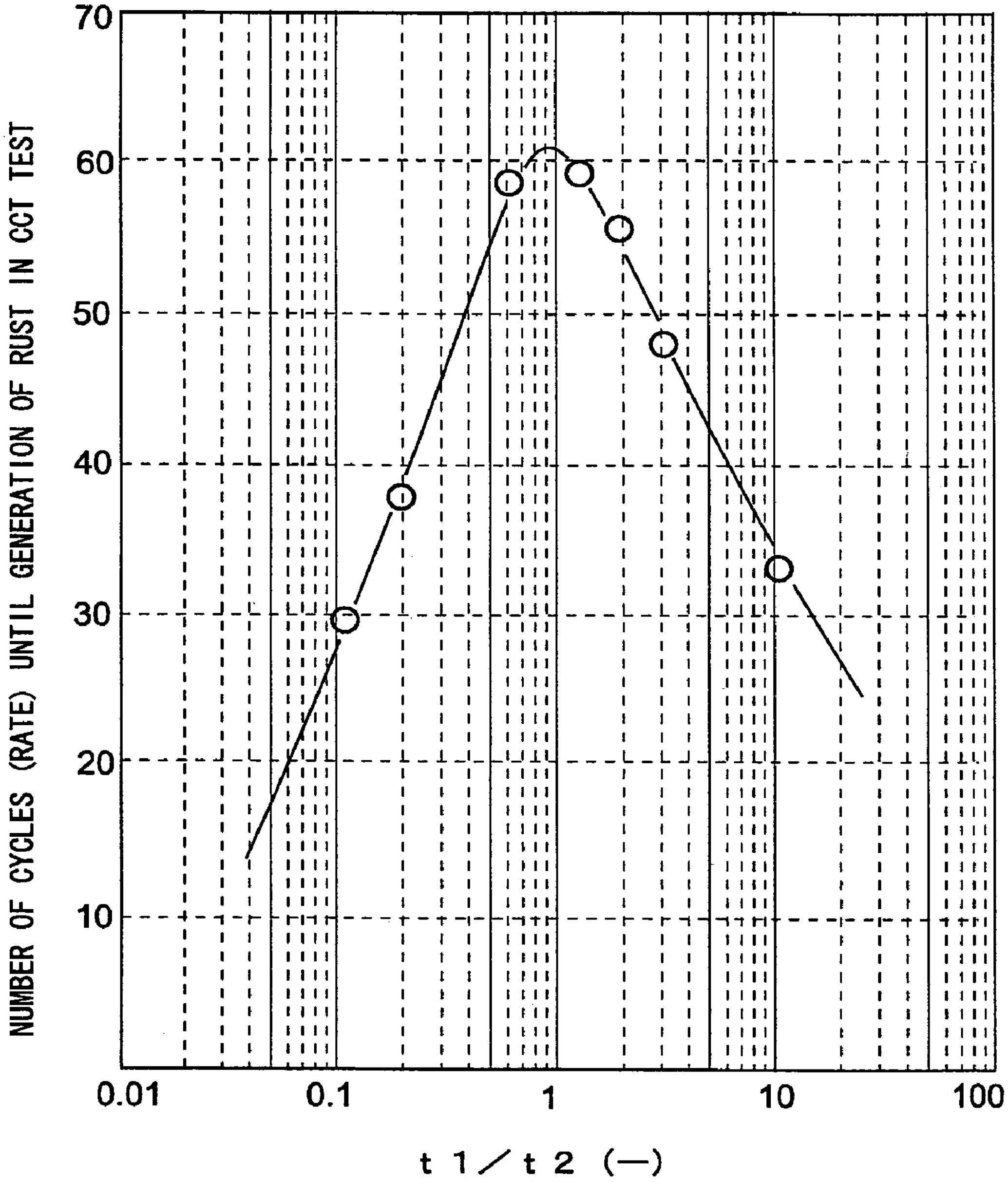
FIG. 2 is a graphic diagram provided for illustrating the relationship between the logarithm of a ratio of the thickness (t1) of the fluorine resin-containing layer to the thickness (t2) of the phenol-modified silicon compound layer and the number of cycles (rate) until the generation of rust on the coated metal formed article in the CCT test.

In addition, FIG. 2 shows the relationship between the ratio of t1 to t2 (t1/t2) and the number of cycles (rate) until the generation of rust in the CCT test as described below. As is evident from the characteristic plot shown in FIG. 2, as far as the ratio of t1 to t2 (t1/t2) is in the range of 0.05 to 50, the number of cycles could be set to 20 or more. In contrast, the number of cycles could be set to about 30 or more when the ratio of t1 to t2 (t1/t2) is in the range of 0.1 to 20, or the number of cycles could be set to about 40 or more when the ratio of t1 to t2 (t1/t2) is in the range of 0.2 to 5.

Furthermore, for obtaining the predetermined anti-rust properties in the CCT test, we can appreciate that a preferable ratio of t1 to t2 is in the range of 0.05 to 50 in consideration of both the thickness (t1) of the fluorine resin-containing layer and the thickness (t2) of the phenol-modified silicon compound layer.

Furthermore, the thickness (t2) of the phenol-modified silicon compound layer may be defined in further consideration of the thickness (t3) of the zinc-containing porous coating layer. That is, the ratio of t2 to t3 (t2/t3) is preferably in the range of 0.06 to 10 because of the follows:

When the ratio of t2 to t3 (t2/t3) is below 0.06, the film formability of the phenol-modified silicon compound layer may remarkably decrease, or the anti-rust properties or the corrosion resistance of the metal formed article may remarkably decrease.

In contrast, when the ratio of t2 to t3 (t2/t3) exceeds 10, a film in uniform thickness may be hardly formed. Thus, the adhesion thereof may decrease. As a result, the anti-rust properties or the corrosion resistance of the metal formed article may decrease.

Therefore, the ratio of t2 to t3 (t2/t3) is more preferably in the range of 0.1 to 5, still more preferably in the range of 0.5 to 3.

Specifically, furthermore, the thickness (t2) of the phenol-modified silicon compound layer may be preferably in the range of 1 to 100 μm because of the follows:

When the thickness of the phenol-modified silicon compound layer is below 1 μm, the film formability may remarkably decrease or the anti-rust properties or the corrosion resistance of the metal formed article may remarkably decrease.

In contrast, when the thickness of the phenol-modified silicon compound layer exceeds 100 μm, a film in uniform thickness may be hardly formed, or the dimensional accuracy of the metal formed article may remarkably decrease.

Therefore, the thickness of the phenol-modified silicon compound layer is preferably in the range of 5 to 50 μm, more preferably in the range of 8 to 30 μm.

(2) Additives

Preferably, furthermore, the phenol-modified silicon compound layer may be added with a dilution solvent such as any of alcohols, ketones, and glycols for adjusting the viscosity thereof at the time of handling.

Preferably, furthermore, for adjusting the viscosity and mechanical characteristics, the phenol-modified silicon compound layer may contain any of inorganic fillers such as glass, quartz, aluminum hydroxide, alumina, kaolin, talc, calcium carbonate, and calcium silicate; organic fillers such as acrylic resin powder, epoxy resin powder, and polyester resin powder; coloring agents typified by pigments and dyes such as carbon black, red ocher, phthalocyanine blue, cream yellow, and titanium dioxide; metal powders; lubricants; mold-releasing agents; surfactants; and coupling agents.

For enhancing the film formability of the phenol-modified silicon compound layer or improving the adhesion thereof, for example, thermosetting resin or metal alkoxide may be preferably added to the layer. More specifically, for example, the thermosetting resin may be epoxy resin, phenol resin, maleimide resin, urea resin, polyimide resin, vinylester resin, silicon compound, or unsaturated polyester resin, independently or in combination with two or more kinds thereof.

More specifically, preferable examples of the epoxy resin to be used may include glycidyl ether type epoxy resin, glycidyl ester type epoxy resin, and glycidyl amine type epoxy resin can be employed. As a main raw material for the epoxy resin, for example, any of propylene glycol, tetraphenylethane, hexahydrophthalic anhydride, bisphenol A, hydrogenerated bisphenol A, hydrogenerated bisphenol F, bisphenol F, tetrabromo-bisphenol A, dimer acid, diaminodiphenyl methane, isocyanuric acid, p-aminophenol, and p-oxybenzoic acid.

Furthermore, preferable examples of the phenol resin to be used may include resol type phenol resin to be processed through a self dehydration/condensation reaction and novolac type phenol resin to be processed through a condensation reaction of phenol and formalin under mild-acidic conditions or alkali conditions.

More specifically, examples of a phenol source to be used may include orthophenol, metaphenol, paraphenol, isopropylphenol, tertiary butyl phenol, paraisopropropenylphenol, nonylphenol, and bisphenol A.

In addition, formaldehyde or acetaldehyde may be commonly used as an aldehyde source.

Furthermore, the maleimide resin to be used may be preferably a resin composition in which a compound having two or more polyfunctional maleimide groups in the molecule occupies about 25% by weight or more.

Examples of such a maleimide resin include 1,2-bismaleimide ethane, 1,6-bismaleimide hexane, 1,12-bismaleimide decane, 1,6-bismaleimide-(2,2,4-trimethyl)hexane, 1,3-bismaleimide benzene, and 1,4-bismaleimide benzene.

Furthermore, as a preferable urea resin, typically, a secondary- or highly-condensation product may be typically used in an addition condensation reaction between urea and formaldehyde may be suitably used for an addition condensation reaction between urea and formaldehyde. Even though the configuration thereof is not specifically limited, it may be also used as a powderly molding material prepared from a dried product (so-called a dry mix) obtained by dehydration drying of a product (so-called a wet mix) obtained by adding a cellulose or the like to a resin solution together with plasticizer, pigment, or the like.

4. Fluorine Resin-containing Layer (1) Basic Configuration

The kinds of the fluorine resin that constitutes the fluorine resin-containing layer 16 exemplified in FIG. 1(*d*) and so on include, but not specifically limited to, acrylate fluoride resin, vinylidene fluoride, urethane fluoride resin, aminofluoride resin, polytrifluoroethylene resin, polytetrafluoroethylene resin, polyhexafluoropropylene resin, ethylene fluoride propylene copolymer resin, polychlorofluoroethylene resin, ethylene-tetrafluoroethylene copolymer resin, tetrafluoroethylene-hexafluoropropylene copolymer resin, and tetrafluoroethylene-perfluoroalkyl vinylether copolymer resin, independently or in combination with two or more kinds thereof.

Furthermore, the organic resin that constitutes the fluorine resin-containing layer 16 is at least one organic resin selected from a polyester resin, a polyacryl resin, a polyolefin resin, a polyurethane resin, and a polycarbonate resin because of the follows:

Such organic resin may allow the predetermined amount of the fluorine resin to be uniformly dispersed and may be highly transparent to facilitate coloring with a coloring agent and a surface improvement with a lubricant agent.

In particular, among these organic resins, the use of polyester resin facilitates the dispersion of fluorine resin. Besides, the polyester resin partially contains a carboxyl group, so that a partial reaction with the phenol-modified silicon compound layer can lead to the formation of a strong interface.

Furthermore, the characteristic feature of the fluorine resin-containing layer 16 is that the amount of the fluorine resin added is in the range of 1 to 200 parts by weight with respect to 100 parts by weight of the organic resin because of the follows:

When the amount of the fluorine resin is below 1 part by weight, the water- or oil-repellency due to the fluorine resin may remarkably decrease and as a result the anti-rust properties or the corrosion resistance of the metal formed article may remarkably decrease.

In contrast, when the amount of the fluoride resin added exceeds 200 parts by weight, a film in uniform thickness may be hardly formed, or the dimensional accuracy of the metal formed article may remarkably decrease. When the amount of the fluoride resin added exceeds 200 parts by weight, furthermore, the adhesion between the fluorine resin-containing layer and the phenol-modified silicon compound layer may decrease and as a result the anti-rust properties or the corrosion resistance of the metal formed article may decrease.

Therefore, the amount of the fluorine resin added is preferably in the range of 5 to 100 parts by weight, more preferably 10 to 40 parts by weight with respect to 100 parts by weight of the organic resin.

Figure 3:
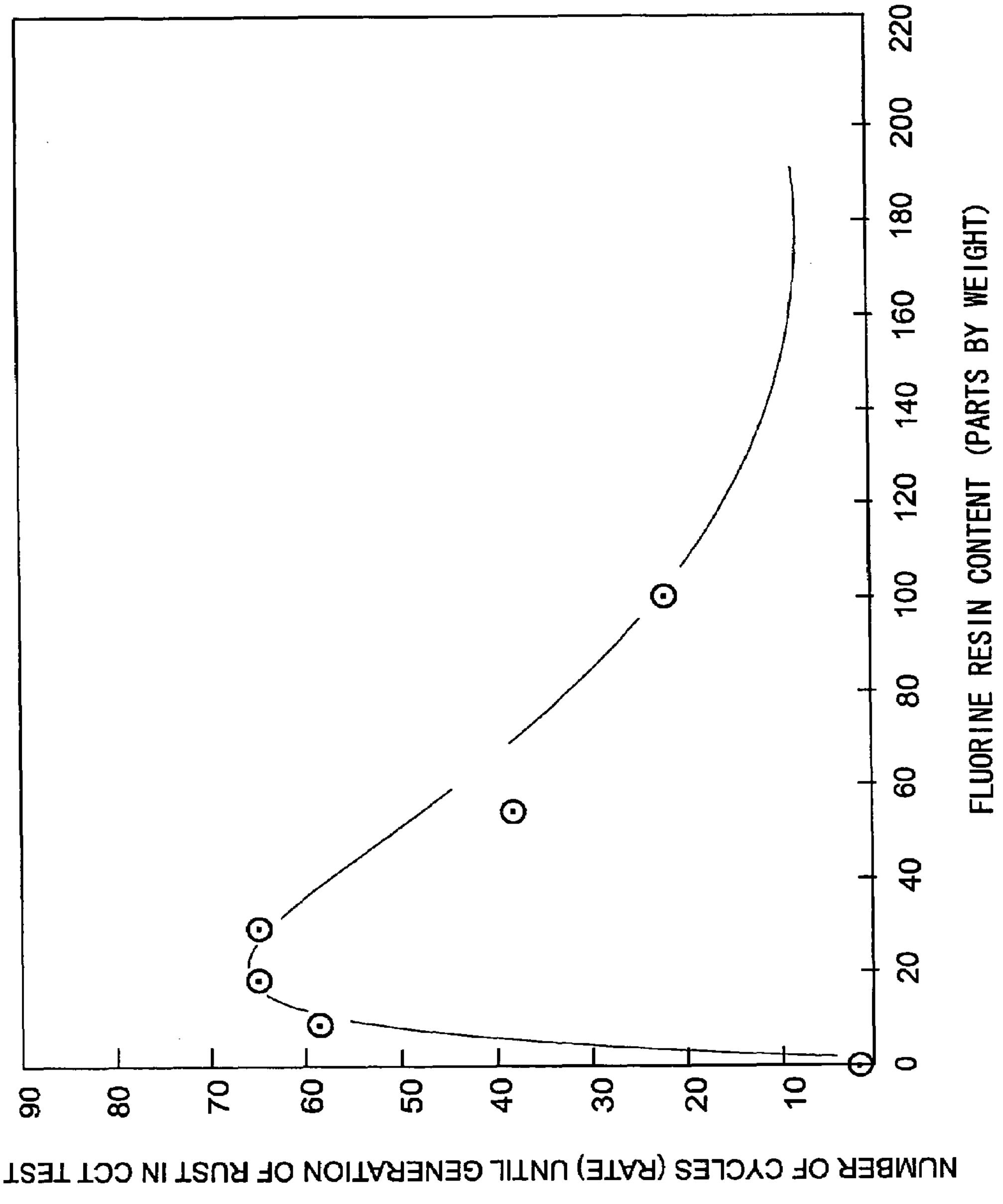
FIG. 3 is a graphic diagram provided for illustrating the relationship between the amount of fluorine resin (parts by weight) added in a fluorine resin-containing layer and the number of cycles (rate) until the generation of rust in the CCT test.

Here, FIG. 3 shows the relationship between the amount of a fluorine resin (parts by weight) added in a fluorine resincontaining layer and the number of cycles (rate) until the generation of rust in the CCT test.

As is evident from FIG. 3, when the amount of the fluorine resin added is in the range of 10 to 40 parts by weight, the number of cycles of the CCT test can be set to 60 or more. In contrast, the number of cycles of the CCT test can be set to 40 or more when the amount of the fluorine resin added is in the range of 5 to 100 parts by weight, or the number of cycles of the CCT test can be set to about 5 or more when the amount of the fluorine resin added is in the range of 1 to 200 parts by weight.

Furthermore, for obtaining the number of cycles of the predefined CCT test, it is effective that the amount of the fluorine resin added (parts by weight) in the fluorine resin-containing layer may be restricted in a predetermined range.

Furthermore, the thickness (t1) of the fluorine resin-containing layer may be preferably in the range of 1 to 100 μm because of the follows:

When the thickness of the fluorine resin-containing layer is below 1 μm, the film formability may remarkably decrease, or the anti-rust properties or the corrosion resistance of the metal formed article may remarkably decrease.

In contrast, when the thickness of the fluorine resin-containing layer exceeds 100 μm, a film in uniform thickness may be hardly formed or the dimensional accuracy of the metal formed article may be remarkably decreased. When the thickness of the fluorine resin-containing layer exceeds 100 μm, the adhesion between the fluorine resin-containing layer and the phenol-modified silicon compound layer may decrease. As a result, the anti-rust properties or the corrosion resistance of the metal formed article may decrease.

Therefore, the fluorine resin-containing layer may have a thickness preferably of 5 to 50 μm, more preferably 8 to 30 μm.

(2) Additives

Furthermore, as in the case with the phenol-modified silicon compound layer, the fluorine resin-containing layer may be preferably added with any of dilution solvents, inorganic fillers, organic fillers, coloring agents, metal powders, lubricant agents, mold-release agents, surfactants, coupling agents, thermosetting agents, and metal alkoxide.

In particular, the lubricant agents include graphite, molybdenum disulfide, boron nitride, liquid paraffin, silicon oil, fluorine oil, machine oil, castor oil, and oleic acid. In addition, the lubricant agent may be preferably in the range of 1 to 30 parts by weight with respect to 100 parts by the fluorine vehicle because of the follows:

The adhesion between the fluorine resin-containing layer and the phenol-modified silicon compound layer could be increased by allowing the fluorine resin-containing layer to be added with the predetermined amount of a lubricant agent. Furthermore, according to the coated metal formed article of the present invention, because of its simple structure, a coated metal formed article having dimensional accuracy and mechanical properties, which may be applied to any of members and parts of various kinds of machinery or the like, could be obtained.

Therefore, the amount of the lubricant agent added is preferably in the range of 2 to 25 parts by weight with respect to 100 parts by weight of the fluorine resin.

Furthermore, the coloring agents include titanium oxide, titanium red, cadmium yellow, cobalt oxide, iron oxide, ferrite, metal-free phthalocyanine pigments, aluminum phthalocyanine pigments, titanium phthalocyanine pigments, iron phthalocyanine pigments, cobalt phthalocyanine pigments, nickel phthalocyanine pigments, tin phthalocyanine pigments, and copper phthalocyanine pigments. In addition, the amount of the coloring agent added is preferably in the range of 1 to 30 parts by weight with respect to 100 parts by weight of the fluorine resin because of the follows:

The fluorine resin-containing layer could be colorized by containing the predetermined amount of the lubricant agent as described above, and also the coated metal formed article could be colorized. Therefore, the coated metal formed article can be used in various kinds of applications.

SECOND EMBODIMENT

Figure 4:
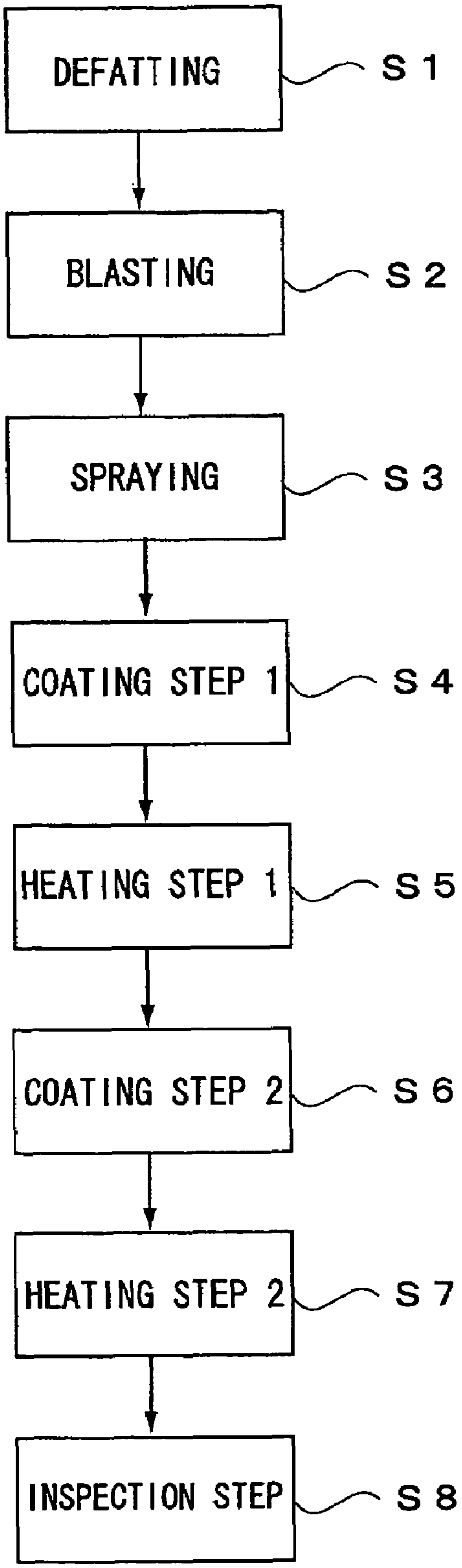
FIG. 4 is a diagram provided for illustrating a flowchart for the production of a coated metal formed article.

The second embodiment of the present invention is a method for producing a coated metal formed article as represented by a flowchart thereof (S1-S8) in FIG. 4, including the following steps (1) to (4):

(1) preparing step for a metal formed article;

(2) forming step for a zinc-containing porous layer using a thermal-spraying device;

(3) forming step for a phenol-modified silicon compound layer;

(4) forming step for a fluorine resin-containing layer containing a fluorine resin as well as at least one organic resin selected from a polyester resin, a polyacryl resin, a polyolefin resin, a polyurethane resin, and a polycarbonate resin, where the amount of the fluorine resin added is in the range of 1 to 200 parts by weight with respect to 100 parts by weight of the organic resin (S6-S8).

1. Step for Preparing Metal Formed Article

As shown in S3 in FIG. 4, in advance of forming a zinc-containing porous layer, it is preferable to clean the surface of a metal formed article as shown in S1 and S2. In other words, as shown in S1, it is preferable to activate the surface of the metal formed article in advance by removing oils therefrom using an organic solvent such as trichloroethylene or trichloroethane or a water-based detergent such as an alkali detergent Next, as shown in S2, it is preferable to form fine irregularities on a physical technique such as shot blast is carried out to clean the surface of the metal formed article in advance. This is because such a surface treatment will significantly improve the adhesion between the metal formed article and the zinc-containing porous layer.

2. Step for Forming Zinc-containing Porous Layer

Subsequently, as shown in S3 in FIG. 4, it is preferable to form a zinc-containing porous layer on the surface of a metal formed article using a thermal-spraying device.

In other words, for example, it is preferable to employ the so-called blast zinc coating method. In this method, a blast material having a coating layer made of a zinc-iron alloy and formed around an iron-based core is projected on the surface of a metal, a material to be processed, by a thermal-spraying device to form a porous coating film of zinc-iron alloy on the surface of the material to be processed.

Figure 5:
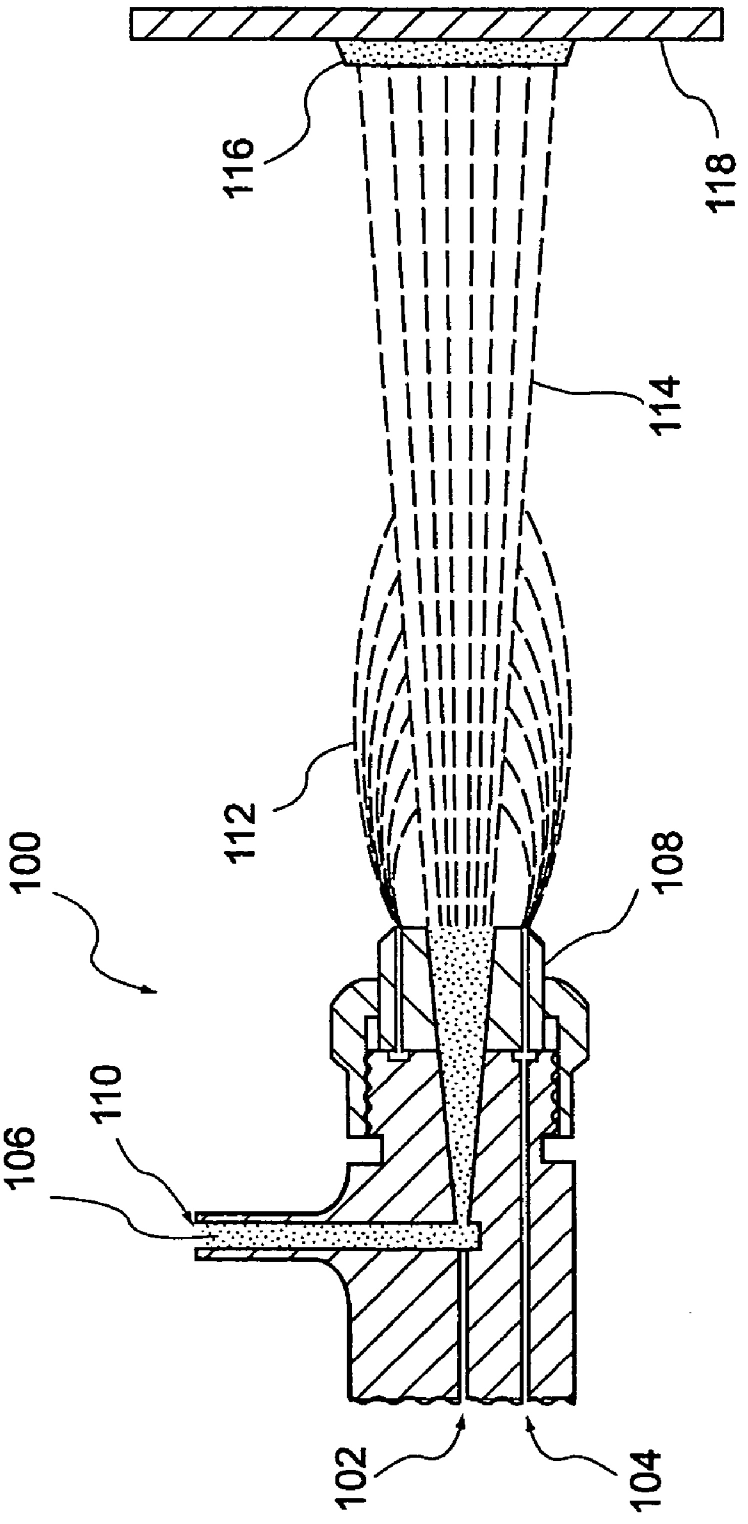
FIG. 5 is a schematic diagram provided for illustrating a thermal-spraying device.

According to the blast zinc coating method, the thermal-spraying device 100 shown in FIG. 5 is employed to clad the zinc-iron ally 106, the blast material, on the surface of the material 118 to be processed, so that sequential lamination of these layers can form a porous layer, a zinc-containing porous layer 116.

The zinc-containing porous layer 116 is superior to a simple zinc coating film with respect to their adhesion properties to iron-based materials to be processed and besides, it has a feature of excellent wetability and permeability because of its large surface energy. Therefore, the zinc-containing porous layer 116 can exert excellent features as a coating film for pre-processing of the subsequent deformation processing and coating treatment.

Furthermore, when the zinc-containing porous layer 116 having a predetermined thickness is formed by carrying out the blast zinc coating method using the thermal-spraying device 100, it is preferable to carry out a blast treatment under the conditions of, for example, using a blast material of a 100 to 500 μm in diameter for 1 to 10 minutes.

3. Step of Forming Phenol-modified Silicon Compound Layer

Subsequently, as shown in S4-S5 represented in the production flowchart of FIG. 4, it is preferable to form an additional layer, a phenol-modified silicon compound layer, on the metal formed article on which the zinc-containing porous layer has been formed.

For instance, as shown in S4, it is preferable that a mixture containing a phenol compound and a silicon compound is dip-coated on the zinc-containing porous coating layer to carry out their preliminary polymerization. Subsequently, as shown in S5, it is preferable to form a phenol-modified silicon compound layer having a predetermined thickness by hardening both the silicon compound and the phenol compound by, for example, heating at 50 to 200° C. for 1 to 60 minutes.

For preparing the phenol-modified silicon compound layer, for instance, any of coating means including dip coating, blowing, spraying, and roll coating may be employed in S4. In particular, the dip coating is suitable because the finished side of the phenol-modified silicon compound layer could be easily controlled to a uniform thickness even if it is performed with a simple device.

Furthermore, for forming the phenol-modified silicon compound layer, in S4, it is preferable that the compounds may be dip-coated while being dissolved in an alcohol solvent or an alcohol solvent mixture because of easiness in handling.

4. Step for Forming Fluorine Resin-containing Layer

Next as shown in S6-S8 represented in the production flowchart of FIG. 4, it is preferable to form a fluorine resin-containing layer on the metal formed article on which the zinc-containing porous layer and the phenol-modified silicon compound layer have been sequentially formed.

For instance, in S6, the metal formed article on which the zinc-containing porous layer and the phenol-modified silicon compound layer is dipped in a bath containing a mixture of a fluorine resin, an organic resin, and so on. Subsequently, in S7, a fluorine resin-containing layer having a predetermined thickness is formed, for example, at a temperature of 50 to 200° C. for 1 to 60 minutes. After that, in S8, it is preferable to examine the resulting coated metal formed article as well as the formation -of the fluorine resin-containing layer.

In addition, when the metal formed article is subjected to dip-coating in S6 or subjected to heat in S7, the treatment may be preferably carried out while imparting a predetermined vibration or rotation using a tumbler device or the like. Furthermore, a plurality of coated metal formed articles housed in a perforated bag or the like may be preferably moved by shaking the bag up and down repeatedly or subjected to ultrasonic vibration.

EXAMPLES

Example 1

1. Preparation of Coated Metal Formed Article

A tabular iron plate (20 cm in length, 20 cm in width and 1 mm in thickness) was prepared as a metal formed article and the surface thereof was then defatted with trichloroethylene and an alkali detergent, followed by subjecting to a blast treatment. Consequently, as shown in FIG. 1(*a*), fine irregularities were formed on the surface of the metal formed article 10.

Next, using a thermal-spraying device 100 as shown in FIG. 5, a zinc-containing porous coating layer 12 of 20 μm in thickness as shown in FIG. 1(*b*) was formed by projecting a blast material 106 on the surface of an iron plate 118. Here, the blast material 106 comprises an aggregate of multi-layered particles substantially made of zinc, each including a core substantially made of iron and an iron-zinc alloy layer formed around the core.

Subsequently, on the zinc-containing porous coating layer thus formed, a mixture containing 100 parts by weight of ethyl silicate, 15 parts by weight of resorcin, 1 part by weight of dibutyltin, and 900 parts by weight of ethanol was applied using a bar-coater. After that, it was heated at 130° C. for 30 minutes in a heating furnace to form a phenol-modified silicon compound 14 having 10 μm in thickness as shown in FIG. 1(*c*).

Then, on the resulting phenol-modified silicon compound layer, a fluorine resin-containing polyester resin solution (30 parts by weight of a fluorine resin and 100 parts by weight of a polyester resin) was applied and then heated at 150° C. for 30 minutes in a heating furnace to form a fluorine resin-containing layer 16 of 30 μm in thickness as shown in FIG. 1(*d*), resulting in a coated metal formed article 20 of Example 1.

2. Evaluation of Coated Metal Formed Article (1) Evaluation of the Corrosion Resistance with SST Test For each of the resulting coated metal formed articles (the number of samples: 10), an examination for the corrosion resistance was performed with the SST test based on JIS Z 2371 (temperature: 35° C., spray with 5% salt solution). The evaluation of the corrosion resistance with the SST test was performed on the basis of the following criteria:

Excellent (++): No generation of red rust was observed after 2,500 hours or more.

Good (+): No generation of red rust was observed after 1,500 hours or more.

Poor (+/−): No generation of red rust was observed after 1,000 hours or more.

NA (−): The generation of red rust was observed before 1,000 hours.

(2) Evaluation of the Corrosion Resistance with CCT Test

For each of the resulting coated metal formed articles (the number of samples: 10), a combined treatment for 8 hours in total, including 4 hours for the SST test based on JIS Z 2371 (temperature: 35° C., spray with 5% salt solution), 2 hours for a drying treatment at 60° C., and 2 hours for a wetting treatment (50° C., 95% Rh), was defined as one cycle and 60 cycles in maximum were then repeated. The evaluation of the corrosion resistance with the CCT test was performed on the basis of the following criteria:

Excellent (++): No generation of red rust was observed after 60 cycles or more.

Good (+): No generation of red rust was observed after 40 cycles or more.

Poor (+/−): No generation of red rust was observed after 10 cycles or more.

NA (−): The generation of red rust was observed after below 10 cycles.

Examples 2 to 4

In each of Examples 2 to 4, the influence of the content of a fluorine resin in a fluorine resin-containing layer was investigated.

In other words, coated metal formed articles (the number of samples: 10) were prepared in the respective examples by the same way as that of Example 1 with the following exceptions: In Example 2, a fluorine resin-containing layer containing 20 parts by weight of a fluorine resin with respect to 100 parts by weight of a polyester resin was formed. In addition, a fluorine resin-containing layer containing 10 parts by weight of a fluorine resin was formed in Example 3, and also a fluorine resin-containing layer was containing 50 parts by weight of a fluorine resin was formed in Example 4. Subsequently, both the evaluation of the corrosion resistance with the SST test and the evaluation of the corrosion resistance with the CCT test were carried out.

Examples 5 to 9

In each of Examples 5 to 9, the relationship between the thickness (t2) of the phenol-modified silicon compound layer and the thickness (t1) of the fluorine resin-containing layer was investigated.

In other words, coated metal formed articles (the number of samples: 10) were prepared in the respective examples by the same way as that of Example 1 with the following exceptions: In Example 5, a phenol-modified silicon compound layer of 2 μm in thickness was formed. In addition, a phenol-modified silicon compound layer of 5 μm in thickness was formed in Example 6, and also a phenol-modified silicon compound layer of 15 μm in thickness was formed in Example 7. Subsequently, both the evaluation of the corrosion resistance with the SST test and the evaluation of the corrosion resistance with the CCT test were carried out.

Furthermore, coated metal formed articles (the number of samples: 10) were prepared in the respective examples by the same way as that of Example 1 with the following exceptions: A fluorine resin-containing layer of 5 μm in thickness was formed in Example 8 and also a fluorine resin-containing layer of 1 μm in thickness was formed in Example 9. Subsequently, both the evaluation of the corrosion resistance with the SST test and the evaluation of the corrosion resistance with the CCT test were carried out.

Examples 10 to 12

In each of Examples 10 to 12, the relationship between the thickness (t2) of the phenol-modified silicon compound layer and the thickness (t3) of the zinc-containing porous coating layer was investigated.

In other words, coated metal formed articles (the number of samples: 10) were prepared in the respective examples by the same way as that of Example 1 with the following exceptions: A zinc-containing porous coating layer of 8 μm in thickness was formed in Example 10, a zinc-containing porous coating layer of 5 μm in thickness was formed in Example 11, and a zinc-containing porous coating layer of 1 μm in thickness was formed in Example 12. Subsequently, both the evaluation of the corrosion resistance with the SST test and the evaluation of the corrosion resistance with the CCT test were carried out.

Example 13

In Example 13, a screw used for an actual machine component was employed in stead of the iron plate as a metal formed article. In other words, a screw was prepared and then defatted using an alkali solution as in the case of Example 1, followed by carrying out a blast treatment to form fine irregularities on the surface of the screw.

Then, as was Example 1, a blast material was projected on the surface of the screw by a thermal-spraying device to form a zinc-containing porous coating layer having a thickness of 20 μm.

Subsequently, the screw having the zinc-containing porous coating layer formed thereon was dipped into a mixture containing 100 parts by weight of ethyl silicate, 30 parts by weight of resorcin, 1 part by weight of dibutyltin, and 900 parts by weight of ethanol. After that, it was heated at 130° C. for 30 minutes in a heating furnace to form a phenol-modified silicon compound layer of 10 μm in thickness.

Subsequently, using a tumbler device, the screw on which both zinc-containing porous coating layer and the phenol-modified silicon compound layer have been formed was suitably sprayed with a fluorine resin-containing solution for 5 hours and then heated at 150° C. for 30 minutes in a heating furnace.

Consequently, the screws, each having a fluorine resin-containing layer of 300 μm in thickness, were provided as coated metal formed articles (the number of samples: 10) and then subjected to both the evaluation of the corrosion resistance with the SST test and the evaluation of the corrosion resistance with the CCT test by the same way as that of Example 1.

Examples 14 to 17

Screws were prepared as coated metal formed articles (the number of samples: 10) by the same way as that of Example 13 with the following exceptions: For forming a phenol-modified silicon compound layer, 30 parts by weight of cresol was used in Example 14, a mixture of 20 parts by weight of phenol and 5 parts by weight of a phenol resin was used in Example 15, 20 parts by weight of pyrogallol was used in Example 16, and 5 parts by weight of trihydroxybenzoic acid was used in Example 17. The evaluation of the corrosion resistance with the SST test and the evaluation of the corrosion resistance with the CCT test were performed on the screws, respectively.

Comparative Examples 1 to 3

In Comparative Example 1, the evaluation of the corrosion resistance with the SST test and the evaluation of the corrosion resistance with the CCT test were respectively performed on coated metal formed articles by the same way as that of Example 1, except that any fluorine resin-containing layer was not formed on a phenol-modified silicon compound layer of 10 μm in thickness.

Furthermore, in Comparative Example 2, the evaluation of the corrosion resistance with the SST test and the evaluation of the corrosion resistance with the CCT test were respectively performed on coated metal formed articles by the same way as that of Example 1, except that a fluorine resin-containing layer containing 80% by weight of fluorine resin on a phenol-modified silicon compound layer of 10 μm in thickness.

Furthermore, in Comparative Example 3, the evaluation of the corrosion resistance with the SST test and the evaluation of the corrosion resistance with the CCT test were respectively performed on coated metal formed articles by the same way as that of Example 1, except that a fluorine resin-coating layer containing 0.1% by weight of fluorine resin was formed.

Furthermore, the fluorine resin-containing layer is allowed to contain a predetermined organic resin such as a polyester resin in addition to a fluorine resin, so that the fluorine resin-containing layer can be formed at a temperature of 250° C. or less, while it can be easily colorized and added with a lubricant agent. Consequently, a coated metal formed article suitable for various applications can be provided.

Furthermore, in addition to a metal formed article and a method for producing such a metal formed article, the coating structure of the present invention can be applicable to a metal iron plate, a ceramic substrate, and so on prior to processing a metal formed article.

TABLE 1

| | Metal formed article | Fluorine resin content (pbw.) | t1 (μm) | t2 (μm) | t3 (μm) | t1/t2 (–) | t1/t3 (–) | SST | CCT |
|---|---|---|---|---|---|---|---|---|---|
| Example 1 | Iron prate | 30 | 30 | 10 | 20 | 3.0 | 1.5 | ++ | ++ |
| Example 2 | Iron prate | 20 | 30 | 10 | 20 | 3.0 | 1.5 | ++ | ++ |
| Example 3 | Iron prate | 10 | 30 | 10 | 20 | 3.0 | 1.5 | ++ | + |
| Example 4 | Iron prate | 50 | 30 | 10 | 20 | 3.0 | 1.5 | ++ | + |
| Example 5 | Iron prate | 30 | 10 | 1 | 20 | 10 | 0.5 | + | + |
| Example 6 | Iron prate | 30 | 10 | 5 | 20 | 2.0 | 0.5 | ++ | ++ |
| Example 7 | Iron prate | 30 | 10 | 15 | 20 | 0.7 | 0.5 | + | + |
| Example 8 | Iron prate | 30 | 5 | 10 | 20 | 0.5 | 0.25 | + | + |
| Example 9 | Iron prate | 30 | 1 | 10 | 20 | 0.1 | 0.05 | + | + |
| Example 10 | Iron prate | 30 | 10 | 10 | 8 | 1.0 | 1.25 | ++ | ++ |
| Example 11 | Iron prate | 30 | 10 | 10 | 5 | 1.0 | 0.5 | ++ | + |
| Example 12 | Iron prate | 30 | 10 | 10 | 1 | 1.0 | 2.0 | + | + |
| Example 13 | Screw | 30 | 30 | 10 | 20 | 3.0 | 1.5 | ++ | ++ |
| Example 14 | Screw | 30 | 30 | 10 | 20 | 3.0 | 1.5 | ++ | ++ |
| Example 15 | Screw | 30 | 30 | 10 | 20 | 3.0 | 1.5 | ++ | ++ |
| Example 16 | Screw | 30 | 30 | 10 | 20 | 3.0 | 1.5 | ++ | + |
| Example 17 | Screw | 30 | 30 | 10 | 20 | 3.0 | 1.5 | ++ | + |
| Comparative Example 1 | Iron plate | 30 | 0 | 10 | 20 | 0 | 0 | ++ | – |
| Comparative Example 2 | Iron plate | 400 | 30 | 10 | 20 | 3.0 | 1.5 | +/– | – |
| Comparative Example 3 | Iron plate | 1 | 30 | 10 | 20 | 3.0 | 1.5 | +/– | +/– |

Examples 1 to 13: Phenol compound (30 parts by weight of resorcin)
Examples 14: Phenol compound (30 parts by weight of cresol)
Example 15: Phenol compound (20 pats by weight of phenol/5 parts by weight of phenol resin)
Example 16: Phenol compound (20 parts by weight of pyrogallol)
Example 17: Phenol compound (5 parts by weight of trihydroxybenzoic acid)

INDUSTRIAL APPLICABILITY

According to the coated metal formed article and the method for forming such a coated metal formed article of the present invention, the excellent anti-rust properties and the corrosion resistance could be obtained, without subjecting to a chromate treatment and without depending on the kind of a phenol compound -to be added to an intermediate layer, by allowing a fluorine resin-containing layer to contain the predetermined organic resin such as a polyester resin in addition to contain a fluorine resin, while sequentially forming a zinc-containing porous coating layer, a phenol-modified silicon compound layer, and a fluorine resin-containing layer on the surface of a metal formed article.

What is claimed is:

1. A coated metal formed article, comprising:

a metal formed article, a zinc-containing porous coating layer laminated on a surface of the metal formed article, a phenol-modified silicon compound layer laminated on the zinc-containing porous coating layer, and a fluorine resin-containing layer laminated on the phenol-modified silicon compound layer, wherein the fluorine resin-containing layer contains a fluorine resin and at least one organic resin selected from a polyester resin, a polyacryl resin, a polyolefin resin, a polyurethane resin, and a polycarbonate resin, wherein an amount of the fluorine resin added is in a range of 1 to 200 parts by weight with respect to 100 parts by weight of the organic resin, and wherein when a thickness of the phenol-modified silicon compound layer is t2 (μm) and a thickness of the fluorine resin-containing layer is t1 (μm), a ratio of t1 to t2 is in a range of 0.05 to 50 so that dimensional accuracy and mechanical properties are increased.

2. The coated metal formed article as described in claim 1, wherein when a thickness of the zinc-containing porous coating layer is t3 (μm), a ratio of t2 to t3 is in a range of 0.06 to 10.

3. The coated metal formed article as described in claim 1, wherein the thickness (t1) of the fluorine resin-containing layer is in a range of 0.5 to 1,000 μm, the thickness (t2) of the phenol-modified silicon compound layer is in a range of 1 to 100 μm, and a thickness (t3) of the zinc-containing porous coating layer is in a range of 3 to 50 μm.

4. The coating metal formed article as claimed in claim 1, wherein the phenol-modified silicon compound layer comprises a mixture or reactant of a silicon compound and a phenol compound, and an amount of the phenol compound added is in a range of 10 to 50 parts by weight with respect to 100 parts by weight of the silicon compound.

5. The coated metal formed article as described in claim 1, wherein the fluorine resincontaining layer contains a lubricant agent, and an amount of the lubricant agent added is in a range of 1 to 30 parts by weight with respect to 100 parts by weight of the fluorine resin.

6. The coated metal formed article as described in claim 1, wherein the fluorine resincontaining layer contains a coloring agent, and an amount of the coloring agent added is in a range of 1 to 30 parts by weight with respect to 100 parts by weight of the fluorine resin.

7. The coated metal formed article as described in claim 1, wherein the amount of the fluorine resin added is in a range of 10 to 40 parts by weight with respect to 100 parts by weight of the organic resin for further enhancing an anti-rust property.

8. The coated metal formed article as described in claim 1, wherein the zinccontaining porous coating layer has a porous structure so that the phenol-modified silicon compound layer is introduced into the porous structure to form a complex and firmly adhered with the zinc-containing porous coating.

9. A method for forming a coated metal formed article, comprising the steps (1) to (4)

(1) preparing step for a metal formed article;

(2) forming step for a zinc-containing porous layer on the metal formed article by using a thermal-spraying device;

(3) forming step for a phenol-modified silicon compound layer on the zinc-containing layer;

(4) forming step for a fluorine resincontaining layer on the phenol-modified silicon compound layer, said fluorine resin-containing layer including a fluorine resin and at least one organic resin selected from a polyester resin, a polyacryl resin, a polyolefin resin, a polyurethane resin, and a polycarbonate resin, wherein an amount of the fluorine resin added is in a range of 1 to 200 parts by weight with respect to 100 parts by weight of the organic resin, and wherein when a thickness of the phenol-modified silicon compound layer is t2 (μm) and a thickness of the fluorine resin-containing layer is t1 (μm), a ratio of t1 to t2 is in a range of 0.05 to 50 so that dimensional accuracy and mechanical properties are increased.

10. The method for forming the coated metal formed article as described in claim 9, wherein the amount of the fluorine resin added is in a range of 10 to 40 parts by weight with respect to 100 parts by weight of the organic resin for further enhancing an anti-rust property.

11. The method for forming the coated metal formed article as described in claim 9, wherein the zinc-containing porous coating layer has a porous structure so that the phenolmodified silicon compound layer is introduced into the porous structure to form a complex and firmly adhered with the zinc-containing porous coating.

12. A coated metal formed article, consisting essentially of:

a metal formed article, a zinc-containing porous coating layer laminated on a surface of the metal formed article, a phenolmodified silicon compound layer laminated on the zinc-containing porous coating layer, and a fluorine resin-containing layer laminated on the phenol-modified silicon compound layer, wherein the fluorine resin-containing layer contains a fluorine resin and at least one organic resin selected from a polyester resin, a polyacryl resin, a polyolefin resin, a polyurethane resin, and a polycarbonate resin, wherein an amount of the fluorine resin added is in a range of 10 to 40 parts by weight with respect to 100 parts by weight of the organic resin, and wherein when a thickness of the phenolmodified silicon compound layer is t2 (μm) and a thickness of the fluorine resin-containing layer is t1 (μm), a ratio of t1 to t2 is in a range of 0.05 to 50 50 that dimensional accuracy and mechanical properties are increased.

13. The coated metal formed article as described in claim 12, wherein the zinc-containing porous coating layer has a porous structure so that the phenol-modified silicon compound layer is introduced into the porous structure to form a complex and firmly adhered with the zinc-containing porous coating.

* * * * *